US007143315B2

(12) United States Patent
Rust et al.

(10) Patent No.: US 7,143,315 B2
(45) Date of Patent: *Nov. 28, 2006

(54) DATA STORAGE SYSTEMS AND METHODS

(75) Inventors: Robert A. Rust, Boise, ID (US); Barry J. Oldfield, Boise, ID (US); Steven Lee Shrader, Boise, ID (US); Christine Grund, Meridian, ID (US); Christopher W. Johansson, Horseshoe Bend, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 388 days.

This patent is subject to a terminal disclaimer.

(21) Appl. No.: 10/688,487

(22) Filed: Oct. 16, 2003

(65) Prior Publication Data

US 2004/0153735 A1 Aug. 5, 2004

Related U.S. Application Data

(63) Continuation of application No. 09/552,669, filed on Apr. 19, 2000, now Pat. No. 6,647,516.

(51) Int. Cl.
*G06F 11/00* (2006.01)

(52) U.S. Cl. .............. 714/42; 714/4; 714/48; 714/54

(58) Field of Classification Search ............. 714/4, 714/6, 8, 11, 42, 48, 52, 54, 712, 715, 799, 714/800
See application file for complete search history.

(56) References Cited

U.S. PATENT DOCUMENTS

| 5,383,201 | A | | 1/1995 | Satterlee et al. |
| 5,388,242 | A | * | 2/1995 | Jewett ..................... 711/113 |
| 5,574,849 | A | * | 11/1996 | Sonnier et al. ............... 714/12 |
| 5,581,688 | A | * | 12/1996 | Jiang et al. .................... 714/3 |
| 5,592,610 | A | | 1/1997 | Chittor |
| 5,680,537 | A | | 10/1997 | Byers et al. |
| 5,928,370 | A | | 7/1999 | Asnaashari |
| 5,953,351 | A | | 9/1999 | Hicks et al. |
| 6,073,251 | A | | 6/2000 | Jewett et al. |
| 6,308,284 | B1 | * | 10/2001 | LeCrone et al. ............... 714/6 |
| 6,370,659 | B1 | * | 4/2002 | Maney ....................... 714/25 |
| 6,519,736 | B1 | * | 2/2003 | Chen et al. ................. 714/768 |
| 6,594,785 | B1 | * | 7/2003 | Gilbertson et al. ........... 714/48 |
| 6,618,825 | B1 | * | 9/2003 | Shaw ......................... 714/55 |
| 6,647,516 | B1 | * | 11/2003 | Rust et al. ................... 714/48 |

* cited by examiner

*Primary Examiner*—Robert W Beausoliel, Jr.
*Assistant Examiner*—Emerson Puente

(57) ABSTRACT

Fault tolerant data storage systems and methods of operating a fault tolerant data storage system are presented. In one aspect of the invention, a fault tolerant data storage system comprises: a plurality of coupled components individually including: an interface adapted to couple with a data connection and to selectively receive a plurality of transactions from the data connection; transaction processing circuitry coupled with the interface and configured to process transactions received from the interface; and analysis circuitry configured to detect error conditions within the transactions and to prevent entry of transactions individually including an error condition into the respective component responsive to the detection.

6 Claims, 4 Drawing Sheets

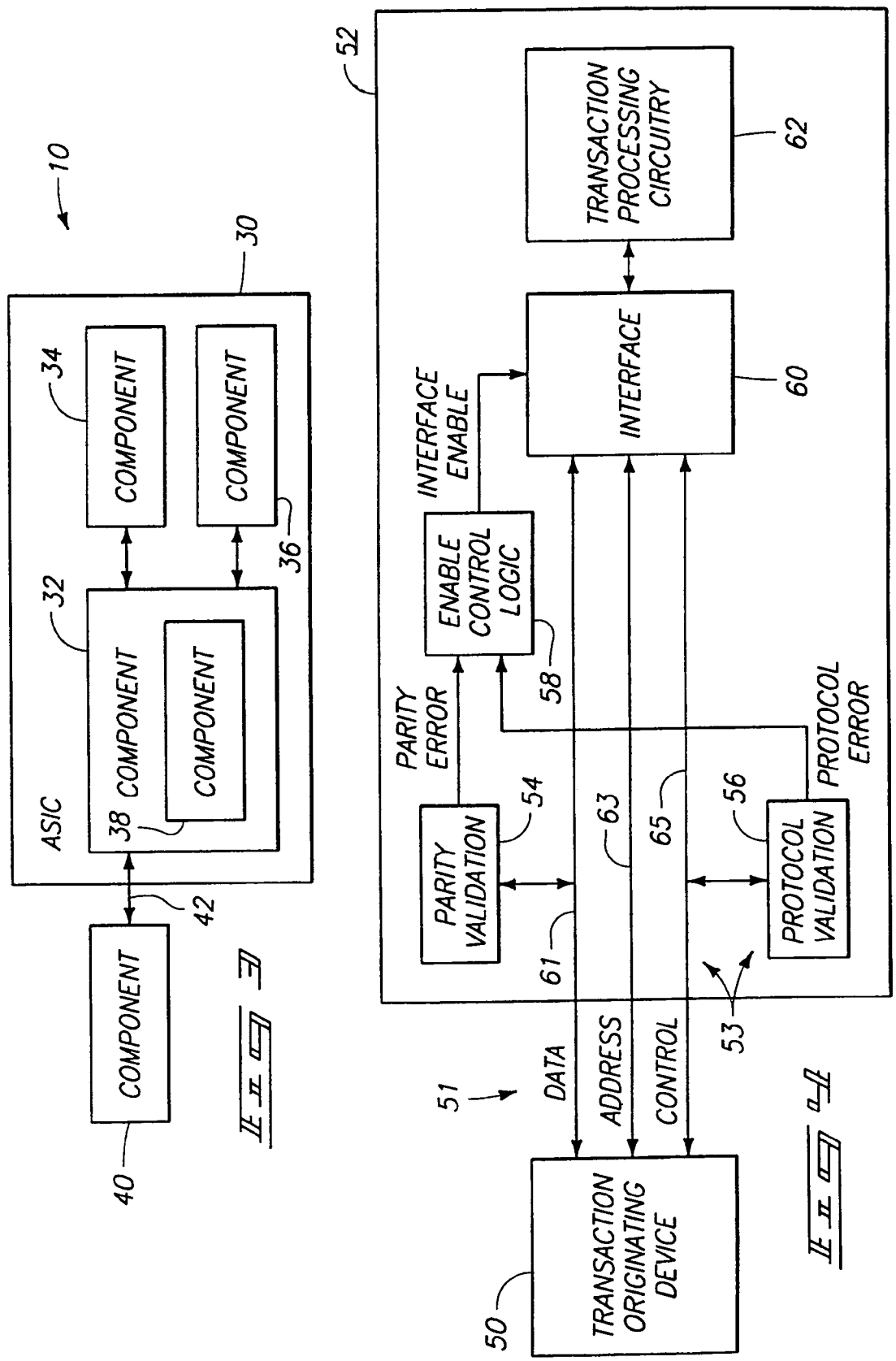

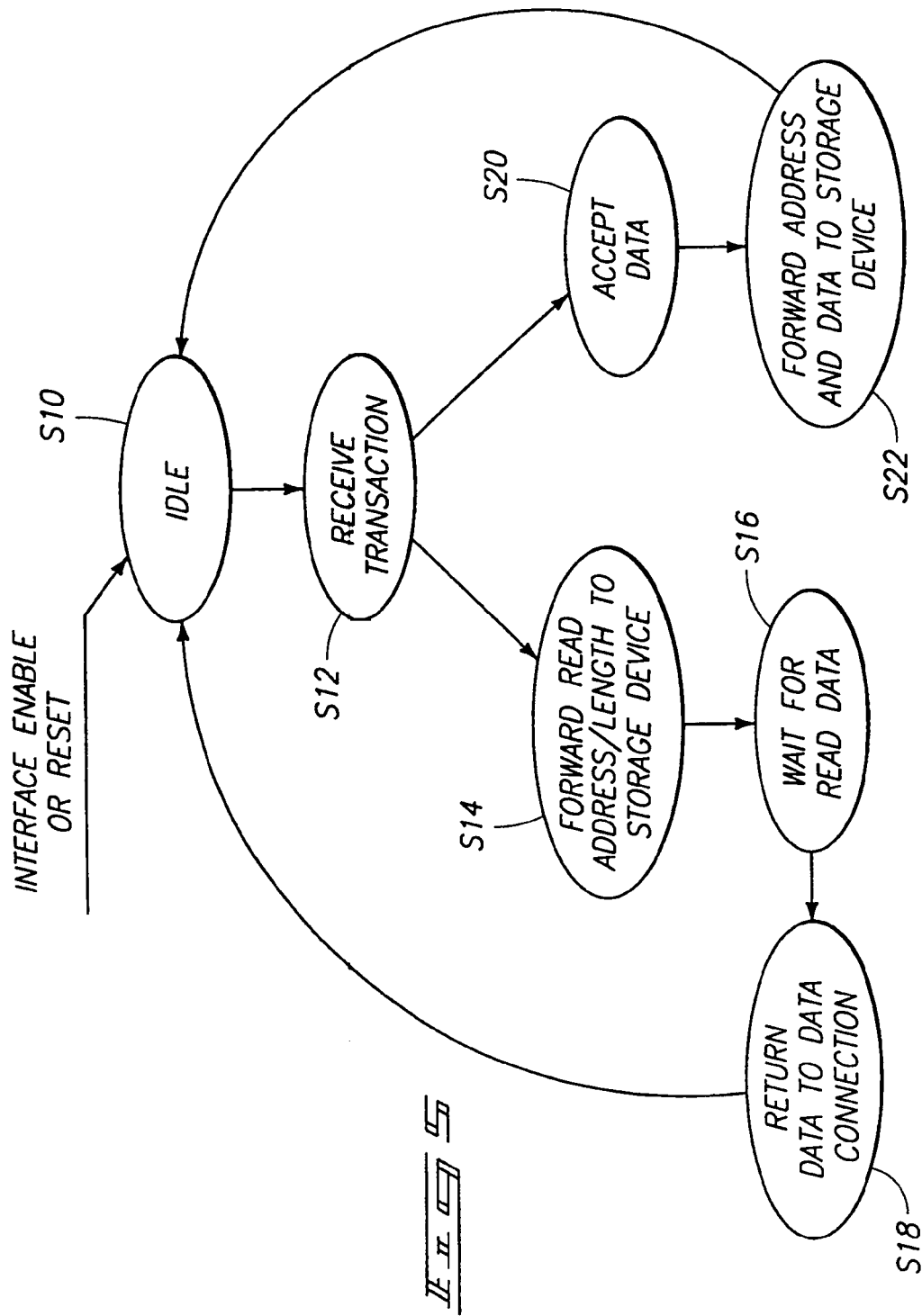

DATA STORAGE SYSTEMS AND METHODS

RELATED PATENT DATA

This patent resulted from a continuation of and claims priority to U.S. patent application Ser. No. 09/552,669, filed on Apr. 19, 2000 now U.S. Pat. No. 6,647,516, entitled "Fault Tolerant Data Storage Systems and Methods of Operating a Fault Tolerant Data Storage System," naming Robert Rust, Barry J. Oldfield, Steven Shrader, Christine Grund, and Christopher W. Johansson as inventors, the disclosure of which is incorporated herein by reference.

FIELD OF THE INVENTION

The invention relates to fault tolerant data storage systems and methods of operating a fault tolerant data storage system.

BACKGROUND OF THE INVENTION

Redundant array of independent disks (RAID) subsystems have been utilized for a number of years. In fault tolerant RAID subsystems, the primary objective for fault tolerance is not to prevent any type of fault from occurring but rather to continue to operate correctly during the presence of a component fault. There are many different methods for achieving the fault tolerant goals. However, even when these objectives are clearly in front of designers, it is often the case that this fault tolerance objective is not actually achieved.

For example, depending on the type of fault, some faults are so large that the system must be completely halted (e.g., a fire). Others will be fairly isolated and potentially corrupt the users data stored on the RAID subsystem. Once data is corrupted, it is generally less desirable to pass the corrupted data back to the host and advertise the data as being good. A system that is tolerant of all faults will not pass corrupted data back to the host.

In the past, fault tolerance was largely viewed as a vehicle to provide robustness and correctness of operation. Fault tolerance becomes very important when considering that the demand for complete data availability is increasing to extreme levels. For example, some systems provide a guaranteed down time of only 5 minutes per year.

The storage subsystem is just one component of many in some large systems. For example, a RAID subsystem may have an allocation of only 1 minute out of the total 5 minutes for yearly down time. Additionally, the subsystems of the RAID subsystems connected to this large system have to share this remaining 1 minute. It is typically unacceptable to ever allow data to become unavailable from the RAID storage subsystem. Further, the restrictions related to loss of data availability are increasing dramatically over time.

In conventional arrangements, one could provide fault tolerance and continued operation by halting all operations in the system, initiating a subsystem wide reset, reconfiguring the system to disable the failed component, and resuming operations after the "warm boot" operation. The time required to reboot the system is so long (on the order of a few seconds) that the data availability goals are significantly impacted by the reboot strategy. Such delays may approach unacceptable periods of time.

Accordingly, there exists a need to provide improved fault tolerant data storage systems and methods of operating fault tolerant data storage systems.

SUMMARY OF THE INVENTION

The invention provides fault tolerant data storage systems and methods of operating a fault tolerant data storage system.

In one aspect of the invention, a fault tolerant data storage system comprises: a plurality of coupled components individually including: an interface adapted to couple with a data connection and to selectively receive a plurality of transactions from the data connection; transaction processing circuitry coupled with the interface and configured to process transactions received from the interface; and analysis circuitry configured to detect error conditions within the transactions and to prevent entry of transactions individually including an error condition into the respective component responsive to the detection.

In another aspect of the invention, a method of operating a fault tolerant data storage system comprises: providing a fault tolerant data storage system including a plurality of components configured to process transactions; providing the transactions for communication to respective components; detecting error conditions within the transactions; and preventing entry of transactions which individually include an error condition into respective components responsive to the detecting.

Another aspect of the invention provides a method of operating a fault tolerant data storage system comprising: providing a fault tolerant data storage system including a plurality of coupled components configured to process transactions; communicating transactions intermediate coupled components; detecting an error condition within one of the transactions; and isolating the component which outputted the transaction including the error condition responsive to the detecting.

Other features and advantages of the invention will become apparent to those of ordinary skill in the art upon review of the following detailed description, claims, and drawings.

DESCRIPTION OF THE DRAWINGS

FIG. 3 is a functional block diagram illustrating exemplary fault domains of an exemplary subsystem of the fault tolerant data storage system.

FIG. 4 is a functional block diagram illustrating communications intermediate exemplary circuit components of the fault tolerant data storage system.

FIG. 5 is a state machine diagram illustrating exemplary states of operation during reception of a transaction within a circuit component of the fault tolerant data storage system.

DETAILED DESCRIPTION OF THE INVENTION

Figure 1:
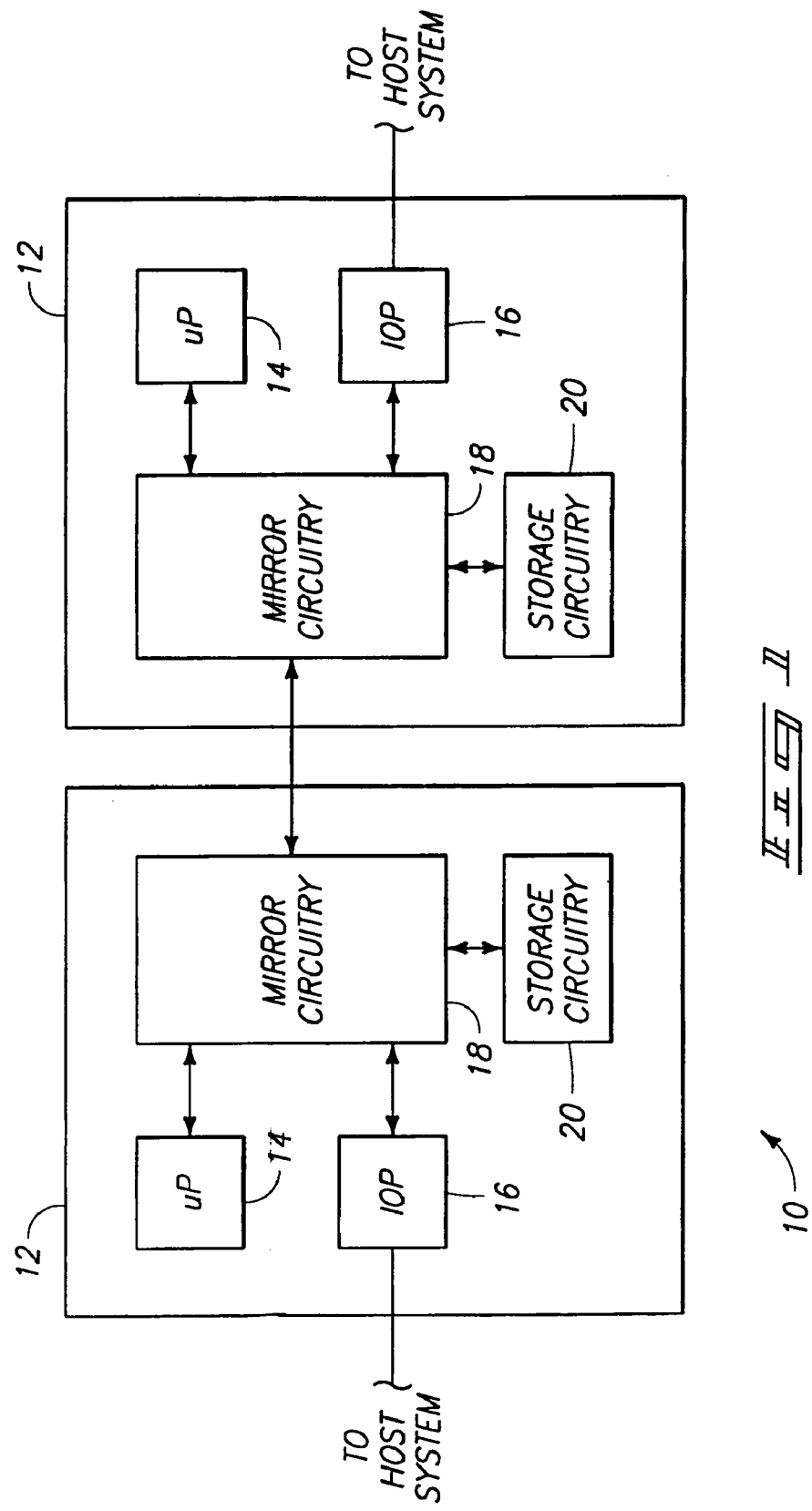
FIG. 1 is a functional block diagram of hardware subsystems of an exemplary fault tolerant data storage system.

Referring to FIG. 1, exemplary subsystems of a fault tolerant storage system 10 are illustrated. Storage system 10 includes redundant circuit configurations 12 in the described embodiment to provide redundant storage of digital data. Circuit configurations 12 are implemented as redundant separate circuit boards in one exemplary embodiment of the present invention. Storage system 10 continues to operate in the presence of fault domains which occur within storage system 10. Such fault domains and operations of storage system 10 are described in further detail below with respect to FIG. 3.

As shown, an individual circuit configuration 12 includes a microprocessor 14, input/output processor (IOP) 16, mirror circuitry 18 and storage circuitry 20. Microprocessor 14 monitors and controls operations within a respective circuit configuration 12 in the described arrangement of storage system 10. Input/output processor 16 is typically coupled with one or more external host device, such as a personal computer, workstation, etc. Such external host device is operable to read redundantly stored data from storage system 10, and to write data to storage system 10 for redundant storage.

Mirror circuitry 18 has access to both storage circuits 20 of the illustrated circuit configurations 12. For example, mirror circuitry 18 of one circuit configuration 12 can access data with respect to a local storage circuit 20 of the given circuit configuration 12 as well as a remote storage circuit 20 located upon the other coupled circuit configuration 12. As used herein, local refers to components within a given circuit configuration 12 while remote refers to components located within the other coupled circuit configuration 12. Mirror circuitry 18 reads and writes data with respect to both storage circuits 20 for redundant operation, or to a single one of storage circuits 20 for other selective operations.

Storage circuitry 20 of an individual circuit configuration 12 is configured to redundantly store data in combination with storage circuitry 20 of the other circuit configuration 12. Storage system 10 is configured as a redundant array of independent disks (RAID) storage system in the described embodiment. Other configurations of storage system 10 are possible. Exemplary storage circuitry 20 of such a RAID storage system includes dynamic random access memory (DRAM) for temporarily buffering data, and a plurality of hard disks for providing storage of data (DRAM and hard disks are not shown).

Figure 2:
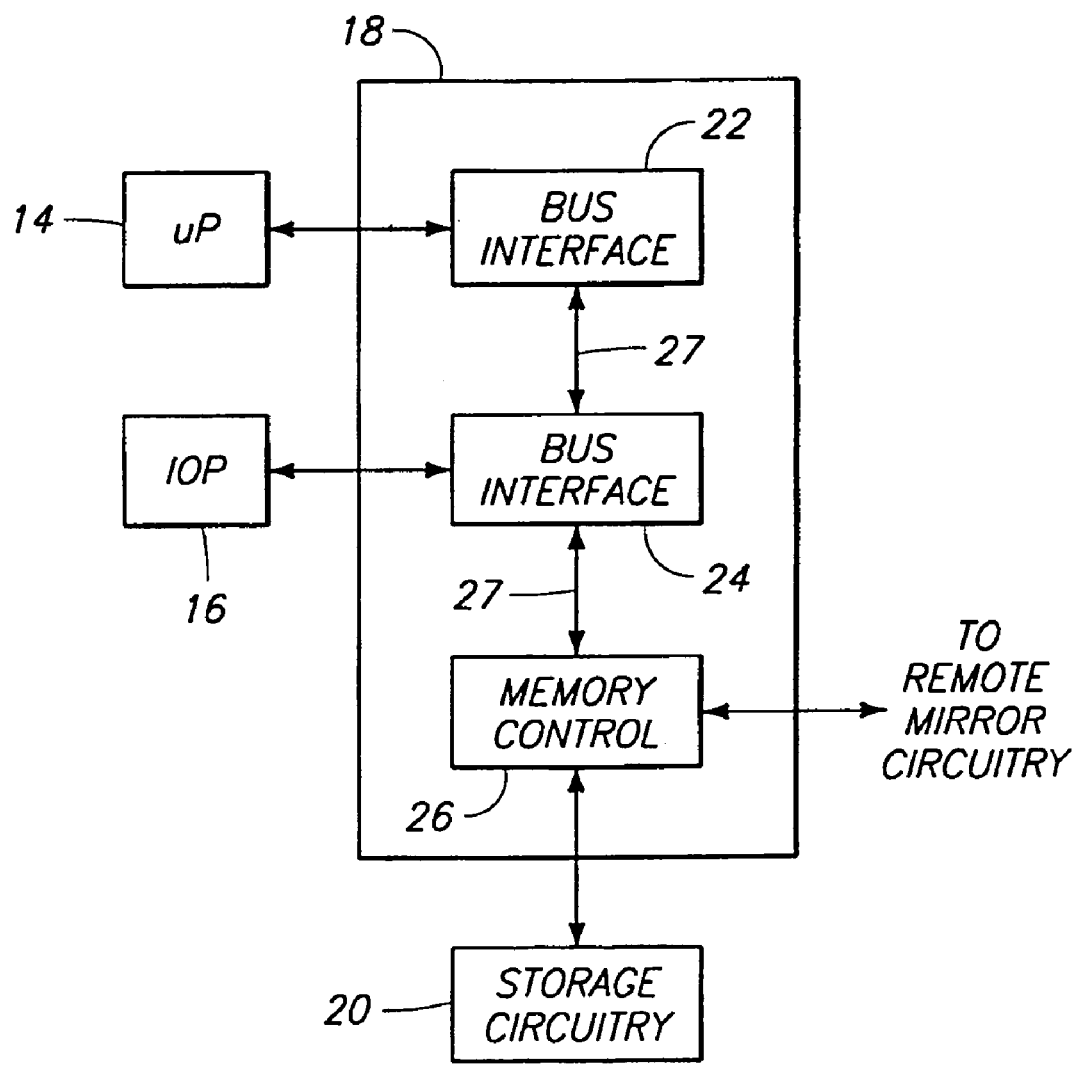
FIG. 2 is a functional block diagram illustrating further details of exemplary mirror circuitry of the fault tolerant data storage system shown in FIG. 1.

Referring to FIG. 2, further exemplary details of mirror circuitry 18 are illustrated. The depicted mirror circuitry 18 includes a bus interface 22, a bus interface 24 and a memory control 26. Bus interfaces 22, 24 and memory control 26 are typically coupled to exchange data and control operations. Bus interface 22 implements communications with microprocessor 14. Bus interface 24 implements communications with input/output processor 16. Memory control 26 implements addressing and transfer of data with respect to local and remote storage circuits 20. In an exemplary configuration, a common bus 27 couples bus interface 22, bus interface 24 and memory control 26.

Referring to FIG. 3, exemplary fault domain concepts within storage system 10 are described. FIG. 3 depicts an exemplary subsystem 30 of storage system 10. Subsystem 30 includes a plurality of exemplary components 32, 34, 36, 38. Component 32 includes an internal component 38 as shown. Component 32 is coupled with an component 40 external of subsystem 30 via a bus 42. In the depicted configuration, subsystem 30 is implemented as an application specific integrated circuit (ASIC). Exemplary components 32, 34, 36, 38, 40 include memory components, processing components, input/output components, bus components, etc. Subsystem 30 can comprise any subsystem of storage system 10 such as a microprocessor, input/output processor, mirror circuitry, etc.

In the following description, components 32, 34, 36, 38, 40 and bus 42 are referred to as respective fault domains. If an error or fault occurs within one fault domain, a neighboring component can detect the occurrence of such error or fault condition as described below. In one exemplary instance, if a fault develops in bus 42, then internal component 32 and external component 40 can detect the failure using logic circuitry in one configuration. One example is a parity error detected on bus 42. Bus 42 may thereafter be identified as corrupt.

Another exemplary fault domain may be associated with component 38 implemented in a buffer configuration in the described example. In such an example, if data is stored within component 38 and such data is later read and a fault condition or error, such as a parity error, is detected by component 32, then component 38 and the associated data are marked as corrupt and all further data transfers are disabled with respect to component 38. Such disablement operations are described in further detail below.

Additionally, if component 32 requires reliable operation of component 38 for proper operation, then internal components 34, 36 as well as components coupled with bus 42 may be notified of a fault somewhere within internal component 32.

In another scenario, it may be assumed that component 40 desires access to component 34 and there may be fault or error conditions determined within component 38. Thereafter, an interface between component 34 and component 32 is disabled responsive to the detection of the error condition. If component 32 requires component 34 to properly complete a transaction, it will terminate a transaction with component 40 with an error condition. Thereafter, the interface intermediate component 40 and internal component 32 is disabled.

During such activity, it is possible for component 36 to be performing required operations without interfacing with component 32. In such a situation, internal component 36 continues operations without the possibility of spreading the corruption or fault condition contained within component 38. In such a methodology, a corruption in component 38 is not spread to neighboring components.

Referring again to FIG. 2, responses within hardware to the presence of fault or error conditions are described. If a given component is affected by a fault or error condition, operations with respect to that particular component are halted. Referring to mirror circuitry 18, protocol-checking engines described below reside within bus interface logic 22, 24. For example, if microprocessor 14 decides to read from a memory location that is out of its predefined range, bus interface 22 detects such erroneous operation and disables the interface to microprocessor 14. Such could result from microprocessor 14 executing within a region of corrupted code. However, input/output processor 16, such as an IO processor for fiber channel or SCSI connectivity to a host system, still has access to storage circuitry 20 once the corruption has been detected.

Referring to FIG. 4, exemplary operations for detecting the presence of error or fault conditions with components, and for implementing corresponding isolation of such faulty components to contain such error or fault conditions locally are described. Isolation of faulty components permits continuation of operation of other non-corrupted components of storage system 10. In preferred aspects of the invention, individual fault components are completely isolated wherein all interfaces coupled with the faulty component are disabled. Such operates to quarantine faulty components. With the use of redundant components, other operations of storage system 10 continue despite the occurrence of the fault.

Components such as a transaction originating device 50 and transaction receiving device 52 are illustrated in FIG. 4. Such devices 50, 52 represent any two components within storage system 10. Component 52 includes a plurality of internal components as described further below. Devices 50, 52 communicate transactions such as read operations, write operations, etc. As illustrated, a data connection 51 including respective data, address and control buses 61, 63, 65 are utilized between devices 50, 52 to implement communications. The illustrated data connection 51 communicates data information, address information and control information intermediate devices 50, 52.

In the depicted arrangement, transaction receiving device 52 includes analysis circuitry 53, interface 60 and transaction processing circuitry 62. In one embodiment, analysis circuitry 53 includes parity validation circuitry 54, protocol validation circuitry 56, and enable control logic circuitry 58. Parity validation circuitry 54 determines parity errors within data being communicated via bus 61 and protocol validation circuitry 56 determines errors within control information communicated via bus 65. Other configurations of analysis circuitry 53 are provided in other embodiments. In one exemplary configuration, transaction processing circuitry 62 includes a DRAM memory controller, hard disk controller, or other controller for accessing storage circuitry 20. Other arrangements of transaction processing circuitry 62 are possible.

Transaction originating device 50 communicates transactions using data connection 51. Interface 60 of transaction receiving device 52 is coupled with data connection 51 to selectively receive a plurality of transactions from data connection 51. Such selective reception operations are described in detail below. Transaction processing circuitry 62 is coupled with interface 60 and such is arranged to process transactions received from interface 60.

Analysis circuitry 53 comprising parity validation circuitry 54, protocol validation circuitry 56 and enable control logic circuitry 58 detects error conditions within transactions communicating using data connection 51 in the described embodiment. Analysis circuitry 53 controls passage of transactions to interface 60 responsive to the detection of error conditions.

In particular, analysis circuitry 53 operates to prevent entry of transactions including error conditions into interface 60 of transaction receiving device 52 responsive to the detection of such errors within the respective transactions.

In the depicted embodiment, analysis circuitry 53 disables interface 60 responsive to the detection of an error condition, such as a parity error and/or a protocol error. Enable control logic circuitry 58 sets an enable bit to control the reception of transactions within interface 60. In one embodiment, enable control logic circuitry 58 operates to de-assert the interface enable signal to prevent the reception of transactions with interface 60. Interface 60 is disabled to isolate transaction receiving device 52 from transaction originating device 50 responsive to the detection of an error condition.

In some aspects of the invention, such isolation using interface 60 is selective according to the type of error condition as described further below. More specifically, analysis circuitry 53 determines the types of error conditions and selectively permits the entry of some transactions (e.g., "force complete" operations described below) into interface 60 and transaction processing circuitry 62 responsive to the determination of the types of error conditions. For example, force complete operations may be identified by analysis circuitry 53 and allowed entry into interface 60 despite the presence of indicated error conditions. In such an example, control information of the transaction (communicated using the control bus of data connection 51) can include a force complete label which informs analysis circuitry 53 including protocol validation circuitry 56 to disregard the presence of a detected error condition and permit entry of the associated transaction.

Force complete operations are utilized for various operations with storage system 10. Such operations can implement background operations to scrub contents of storage circuitry 20 enabling repair of respective components. For example, such identifies and enables repair of memory in regions where data is not accessed frequently. Some DRAMs develop single bit errors which can turn into multiple bit errors within a single word if not corrected. Force complete operations permit background operations such as scrubbing to continue operation without resulting in the isolation of components within storage system 10.

As previously stated, force complete identifications may be utilized within control information communicated using data connection 51. Such indicates that a transaction is specifically related to a background process, for example. Although one component may alert the other component of the presence of the error, the receiving component can continue to process the transaction without isolating the sending component. Accordingly, the primary operation of storage system 10 is not impacted by faults or errors within force complete operations. In sum, force complete operations enable the execution of background operations to make repairs to storage system 10 while such system continues to operate.

Although not shown in FIG. 4, transaction originating device 50 includes an interface to couple with respective data connection 51 to implement communications between transaction originating device 50 and data connection 51. Similarly, transaction originating device 50 can include appropriate analysis circuitry to selectively prevent entry of transactions into transaction originating device 50.

According to other embodiments of the present invention, analysis circuitry 53 communicates the detection of error conditions. Data connection 51 is utilized according to some aspects of the invention to communicate the detection of error conditions. For example, protocol validation circuitry 56 can communicate the presence of error conditions to transaction originating device 50 using data connection 51. Accordingly, such analysis circuitry 53 communicates the detection of error conditions to other components such as transaction originating device 50. Additionally, analysis circuitry 53 including enable control logic 58 is utilized in some aspects to communicate the detected error conditions using the interface enable signal which can be additionally communicated outside of transaction receiving device 52.

Although not shown, devices 50, 52 may be coupled with other components of storage system 10 in other embodiments. Other components coupled with devices 50, 52 also include respective analysis circuitry and interfaces to detect the communication of errors within respective transactions and to isolate such devices from devices communicating transactions including error conditions. Given the provision of redundant components within storage system 10 as shown in FIG. 1, the chances are enhanced and increased of storage system 10 continuing to operate responsive to the failure or occurrence of fault within a given component.

Components 50, 52 individually include additional interfaces 60 to communicate with other additional components not shown. Following isolation of a component from another component using an appropriate interface, the properly operating component continues to operate with respect to such other properly operating components. For example, such properly operating components continue to process transactions utilizing respective transaction processing circuitry.

Referring to FIG. 5, a state machine is depicted for processing of read and write transactions within analysis circuitry 53 and interface 60 of a given component of storage system 10. In particular, FIG. 5 illustrates states of interface 60 during such operations with respect to transactions.

At state S10, interface 60 is idle responsive to the enablement signal from analysis circuitry 53 or a reset condition.

State S12 represents the reception of a transaction, for example, by an appropriate data connection coupled with interface 60.

For read operations as indicated by the transaction, interface 60 forwards address data and length information to the associated memory control and storage circuitry coupled within interface 60 at state S14.

At state S16, interface 60 waits for the reception of read data from the associated memory control and associated storage circuitry.

At state S18, interface 60 returns data to the associated data connection.

For write operations, the state of interface 60 proceeds from state S12 to state S20 wherein data to be written is accepted from the appropriate data connection.

At state S22, interface 60 forwards address information and the associated data to the appropriate storage device. For example, such may implemented using transaction processing circuitry 62 comprising a memory controller or hard disk controller.

Following states S18, S22, the state of interface 60 returns to the idle state at S10 as long as interface 60 is enabled from analysis circuitry 53.

Aspects of this invention provide a fault tolerant data storage system 10. The described fault tolerant data storage system 10 provides a host system with increased chances of access to data while one or more component of the storage system 10 experiences a fault or error condition. The configuration and operation of storage system 10 are not altered in order to provide features of the present invention. Further, processor interaction is not required in certain aspects of the invention to maintain storage system operation. Aspects of the invention enable no or minimal loss of data availability as faults occur in numerous situations. Lengthy reconfiguration cycles are avoided. The faults are handled in real time without processor intervention in the disclosed arrangements of the present invention.

The protection sought is not to be limited to the disclosed embodiments, which are given by way of example only, but instead is to be limited only by the scope of the appended claims.

What is claimed is:

1. A data storage method comprising:
storing digital data using a data storage system;
communicating a plurality of transactions intermediate a plurality of components of the data storage system:
processing the transactions using the components;
using the components, effecting operations with respect to storage of digital data responsive to the processing;
identifying one of the transactions from one of the components as including a fault;
disabling communications of others of the transactions from the one component responsive to the identifying; and
wherein the disabling comprises disabling communications comprising a first type of transactions from the one component, and further comprising receiving and processing a second type of transactions from the one component after the identifying and during the disabling of communications comprising the first type of transactions.

2. The method of claim 1 wherein the storing digital data comprises redundantly storing digital data using a plurality of redundant storage circuits of the data storage system.

3. The method of claim 1 wherein the disabling comprises disabling respective interfaces of the other components responsive to the identifying.

4. The method of claim 1 further comprising processing transactions using the other components after the disabling.

5. The method of claim 1 wherein the storing comprises redundantly storing a single data item of the digital data in a plurality of storage devices.

6. The method of claim 5 wherein the storing comprises storing the single data item in the storage devices comprising hard disks.

* * * * *

UNITED STATES PATENT AND TRADEMARK OFFICE
CERTIFICATE OF CORRECTION

PATENT NO. : 7,143,315 B2  Page 1 of 1
APPLICATION NO. : 10/688487
DATED : November 28, 2006
INVENTOR(S) : Robert A. Rust et al.

It is certified that error appears in the above-identified patent and that said Letters Patent is hereby corrected as shown below:

In column 8, line 12, in Claim 1, delete "system:" and insert -- system; --, therefor.

Signed and Sealed this

Thirteenth Day of July, 2010

David J. Kappos
*Director of the United States Patent and Trademark Office*